Sept. 5, 1950 W. C. RAUTTER 2,521,479
PHOTOELECTRIC CURRENT LIMITER FOR MOTORS
Filed June 17, 1949 2 Sheets-Sheet 1

INVENTOR.
W. C. Rautter
BY
Harry Langsam
Attorney

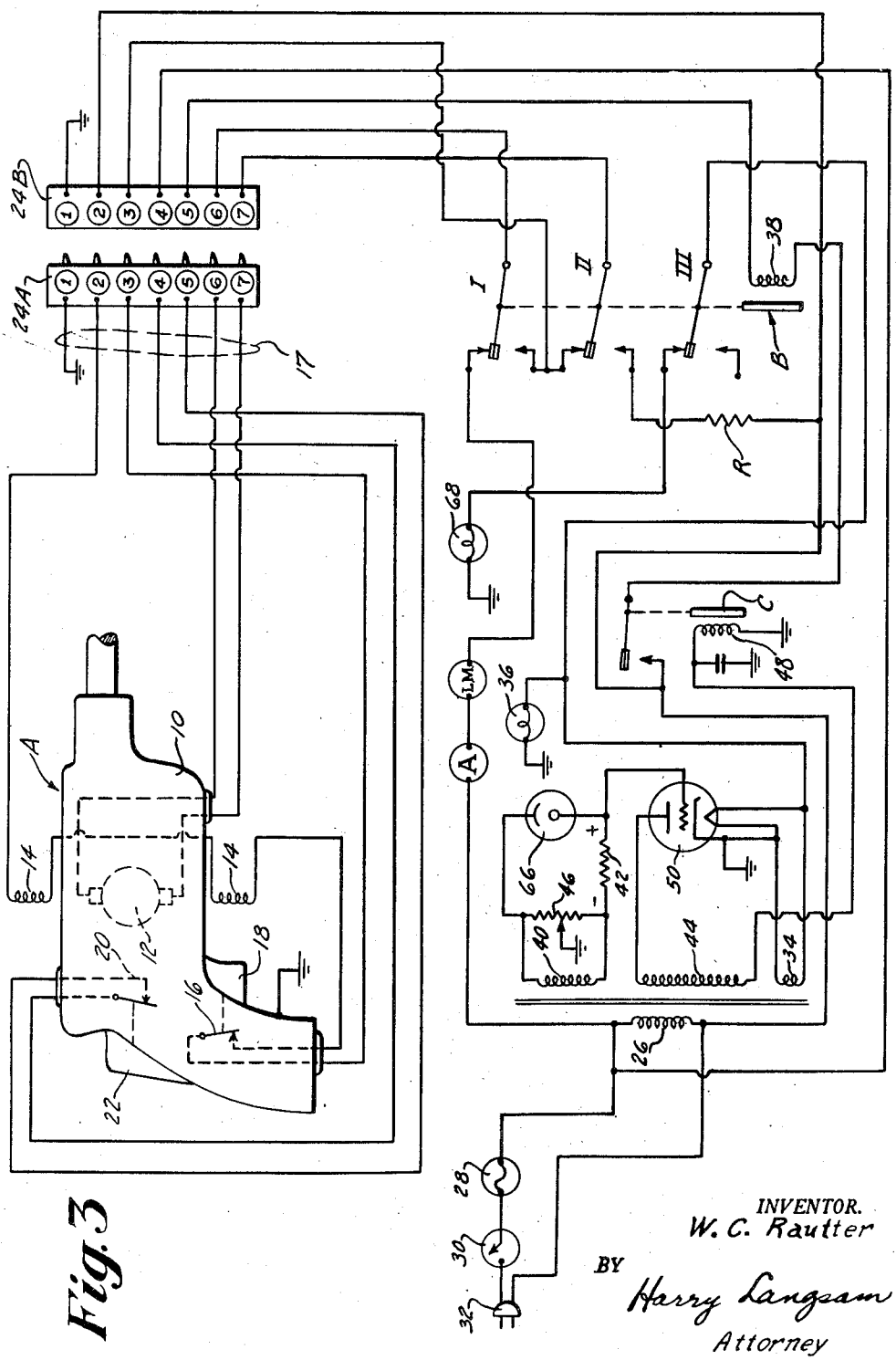

Patented Sept. 5, 1950

2,521,479

UNITED STATES PATENT OFFICE 2,521,479

PHOTOELECTRIC CURRENT LIMITER FOR MOTORS

Walter C. Rautter, Philadelphia, Pa.

Application June 17, 1949, Serial No. 99,638

2 Claims. (Cl. 318—275)

My invention relates to overload controls for electric motors, and relates particularly to a control which is actuated whenever the motor encounters a pre-determned value of resistance to its rotation.

The control is particularly adapted for use with a machine tool known as a tube expander, but it is also useful for automatic screw-drivers, nut-drivers, tapping guns, drills, reamers, and similar machines.

Certain types of boilers and condensers are constructed by attaching large number of tubes between header plates. Holes are drilled in these plates; and the ends of the tubes are then inserted into the holes and are expanded into metal-to-metal contact with the plates by use of an expanding tool.

Since the holes are drilled as closely together as possible, in order to accommodate the greatest number of tubes in the plate, it is possible by over-expanding a tube to deform the adjacent holes. This causes leaks, and it is therefore, necessary that each tube in the structure be expanded to a precise amount, whereby the seal is perfect yet the plate is not distorted.

The problem resolves itself into one of stopping the electric driving motor when the load encountered rises to a predetermined value. One method of accomplishing this result is to employ an overload circuit breaker in circuit with the series-wound driving motor. Thus, as the load increases, the motor is slowed down, the counter-E. M. F. developed by the motor decreases, and the current drawn by the motor increases. The circuit breaker is adjusted to trip at the value of line current corresponding to the maximum load.

Practically, this arrangement has not worked very well because a circuit breaker which can trip on small differentials of line current is practically a precision instrument. When operating in and about the range of tripping current, the contacts have a tendency to chatter, causing the expanding tool to buck and otherwise behave erratically.

In addition, the circuit breaker is not adapted to be re-set for different line current with the necessary degree of accuracy and facility.

It, therefore, is an object of my invention to provide a current-limiting control which is accurately responsive to a current (or voltage) of any pre-determined value, and which will operate in a positive manner to control a machine tool motor.

Another object of my invention is to provide a control of the character described which can be easily and accurately re-set to trip at any desired value of current.

Another object of my invention is to provide a control of the character described which will not only disconnect the motor at the proper time, but will also reconnect it to provide dynamic braking, so that the motor will stop in a very short time after its current supply is disconnected.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 3 is a schematic diagram of the complete control, together with the tool with which it is used.

Figure 1:
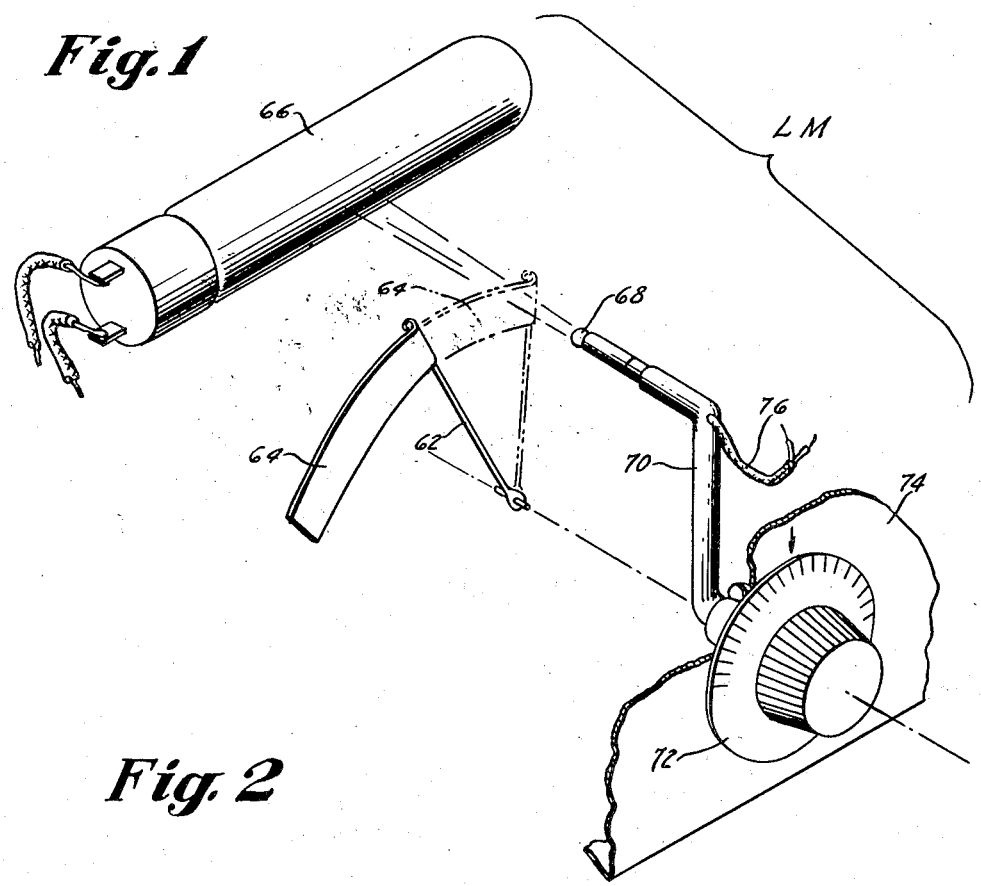
Fig. 1 is a fragmentary exploded view of the special current meter used with my invention, the meter movement being omitted for clarity.

Referring now to the drawings, wherein similar reference characters designate similar parts, I show an expanding tool, generally designated as A. The tool has an electric motor incorporated in a hand-gun housing 10. The motor has an armature winding 12 and a pair of field coils 14 adapted for series operation. An SPST switch 16 is closed by the trigger 18, and a second SPST switch 20 is actuated by a movable projection 22 in the rear of the gun handle. The trigger switch 16 is the main on-off switch and is provided with the customary detent to permit continuous operation of the tool. The switch 20 is adapted to be closed when the rear projection 22 is pushed in by the operator's palm when he presses the tool into a tube. The motor field coils 14 are wired in series with the trigger switch 16 and are brought out through a cable 17 to terminals 2 and 3 of a seven-pin connector plug 24A. The operating switch 20 is connected to terminals 4 and 5 of the plug and the armature winding connects to terminals 6 and 7 of the plug. The motor of the tool is connected and energized through the control, depicted schematically in the lower part of Fig. 1. In the control circuit, presently to be described, the motor current flows through a special meter marked LM in the drawings. The meter pointer 62 carries an opaque flag 64 which, at a predetermined value of current, interrupts a beam of light shining upon a photo-electric cell 66. When this occurs, the control circuit operates to disconnect the motor from the power source and re-connects the motor as a generator to a load R, to provide dynamic braking. The current supply to the light source is also disconnected, so that once the beam of light is interrupted the motor is cut off cleanly and positively. The meter movement (not shown) is damped so that it does not respond to transient surges, but only to the more constant increases of current which accompany the increasing load encountered by the tool.

Figure 2:
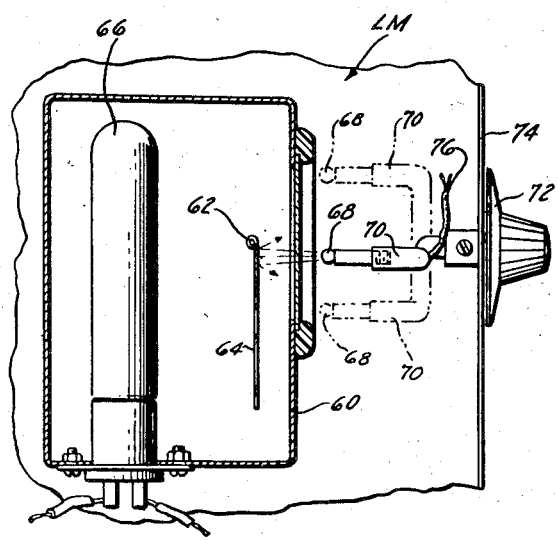
Fig. 2 is a fragmentary plan view of the current meter shown in Fig. 1.

As shown in Figs. 1 and 2, the light meter LM comprises a damped meter movement (not shown) which may be of the conventional moving vane type, within a housing 60. The meter pointer 62 carries an arcuate flag 64.

A photo-electric cell 66 is mounted horizontally within the housing, behind the pointer. A tiny pre-focussed electric lamp 68 is mounted at the end of a hollow gooseneck 70 which is adapted to be rotated in an arc parallel to the arc of the pointer flag 64 by means of a dial 72 on the front panel 74. The dial 72 has reduction gearing incorporated therein, and is calibrated with reference to an index mark on the front panel. The electric lamp 68 is supplied with current by a flexible pair 76 which connects to the control circuit. By means of the calibrated dial 72, the lamp 68 may be rotated gradually, and when energized, the lamp emits a narrow beam of light which illuminates the photo-electric cell. At the particular value of current indicated by the dial 72, the flag carried by the meter needle will pass between the lamp 68 and the photocell 66, interrupting the light path and tripping the control circuit.

The control circuit contains a power supply transformer having a primary winding 26 which is energized from the alternating current line through a fuse 28, an on-off switch 30 and a line plug 32. A low voltage secondary winding 34 supplies heater current to a vacuum-tube triode 50, current to an ordinary pilot light 36, and current to the meter light 68 through the third pole contacts of a three-pole, double throw relay, generally designated as B. These contacts, it should be noted, are closed only when the relay coil 38 is not energized, which is the normal condition when the motor is operating.

Another secondary winding 40 of the transformer supplies plate voltage to the photo-electric cell 66 located in the meter LM through a load resistor.

A third secondary winding 44 supplies plate voltage for the triode amplifier tube 50 through the field coil 48 of a SPST relay C.

A sensitivity control potentiometer 46 is connected across the photocell winding 40 of the transformer, with its movable arm grounded. The triode grid is connected to the positive end of the load resistor 42. Consequently, the grid bias of the triode 50 consists of the positive voltage developed by the photocell load resistor 42 in series with a variable A. C. voltage whose magnitude depends upon the distance of the potentiometer arm from the negative end of the load resistor. This A. C. voltage is in phase with the triode plate voltage, and is, therefore, equivalent to an additional positive voltage.

When the control is plugged in and turned on, the relay B is not energized, consequently it has the position shown in the figure. The upper contacts of pole 3 being closed the meter light 68 glows and illuminates the photocell 66. The photocell then develops a positive bias across resistor 42, which in combination with the bias voltage derived from the sensitivity control causes the triode to pass plate current, energizing the SPST relay C, and separating the contacts thereof as shown. It is to be noted that the coil of the relay B is in series with these contacts, the line, and the operating switch 20 in the tool handle. To use the tool, the operator grasps the handle, thereby closing trigger switch 16, and also the switch 20. Terminal 2 of the connector socket 24B being connected to the unfused side of the line, current flows therefrom to terminal 2 of the plug, thence to the motor field 14, thence to trigger switch 16, and then to terminal 3 of the plug. The current then passes into terminal 3 of the socket, then through the upper, closed, contacts of pole 2 of relay B, through pin 7 of the connector to the armature, thence through pin 6 of the connector to pole 1 of relay B, then through the upper, closed, contact to the meter LM, through an ordinary ammeter A and finally to the fused side of the line.

The circuit is now complete and the motor operates.

As the tool is pushed into the tube being expanded, it encounters more resistance and the motor current rises. The pointer or meter LM advances until the flag 64 interrupts the beam of light falling upon the photocell. The instant this occurs the positive bias developed across the photo-cell load resistor disappears, and the triode plate current drops sharply. Relay C becomes de-energized and permits its contacts to close. The coil of the relay B now becomes energized, closing the lower contacts of all three poles thereof. The contacts of pole III now open and extinguish the meter lamp 68. Poles I and II of the relay cooperate to re-connect the series motor as a generator feeding a low resistance load designated as R in the figure. Sometimes this resistor can be omitted and a wire used instead to complete the circuit, especially if the motor is not likely to be burned out by this method of braking. Ordinarily, the motor will stop within one revolution of its tool shaft, accordingly the overload period is very short.

When the motor stops, signifying that the work has been expanded to the desired degree, the operator withdraws the tool and releases the operating switch 20.

This de-energizes relay C closing its contacts, permitting the lamp 68 to re-light, and the tool is again ready for use.

The purpose of extinguishing the lamp as soon as the beam of light is blocked by the flag is to prevent intermittent operation comparable to the chatter of a relay. Once the light beam is interrupted, the control operates positively to stop the motor.

It is to be noted that the starting current of the motor cannot trip the control because the operating switch 20, which is in series with the field coil of relay B, is not closed until the operator depresses the switch 20 by which time the motor is already rotating and consuming normal operating line current.

The ammeter A is used to check the control and may also be used to obtain particular values of motor current for reference.

By the use of this tool it is also possible to drive screws precisely to any depth, once the control has been adjusted for the particular material. This is easily determined by trial, and once the particular setting of the dial 12 has been noted, the setting is reproducible at any time. The accuracy of the control is principally determined by the accuracy of the movement in the meter LM, and this accuracy, with ordinary commercial instruments is of the order of 1%. The relays B and C are ordinary commercial types and present no special requirements or problems. The capacitor shunted across the coil of relay B serves to improve its operation on the half-wave plate current of the triode tube, and a suitable value of this capacitor is 50 micro-farads.

Although my invention has been described in considerable detail, such description is intended as being illustrative rather than limiting, since the invention may be variously embodied, and the scope of the invention is to be determined as claimed.

I claim as my invention:

1. A current control for an electric machine tool motor comprising a source of light, a current meter having a movable pointer and being connected to indicate the current drawn by said motor, an opaque flag carried by said pointer, a photo-electric cell, said pointer being located between said source of light and said photo-electric cell, means responsive to the illumination cast upon said cell by said source of light for disconnecting said motor from its current source and for re-connecting said motor as a generator to an electrical load for rapid braking.

2. The invention of claim 1 including means to reset the trip for any desired value of current.

WALTER C. RAUTTER.

REFERENCES CITED

The following references are of record in the file of this patent:

UNITED STATES PATENTS

| Number | Name | Date |
| --- | --- | --- |
| Re. 20,476 | Wilson et al. | Aug. 17, 1937 |
| 1,559,832 | Wright et al. | Nov. 3, 1925 |
| 2,057,472 | Bonds | Oct. 13, 1936 |